March 25, 1958 L. KNIGHT ET AL 2,828,418
DATA STORAGE DEVICES
Filed March 2, 1955
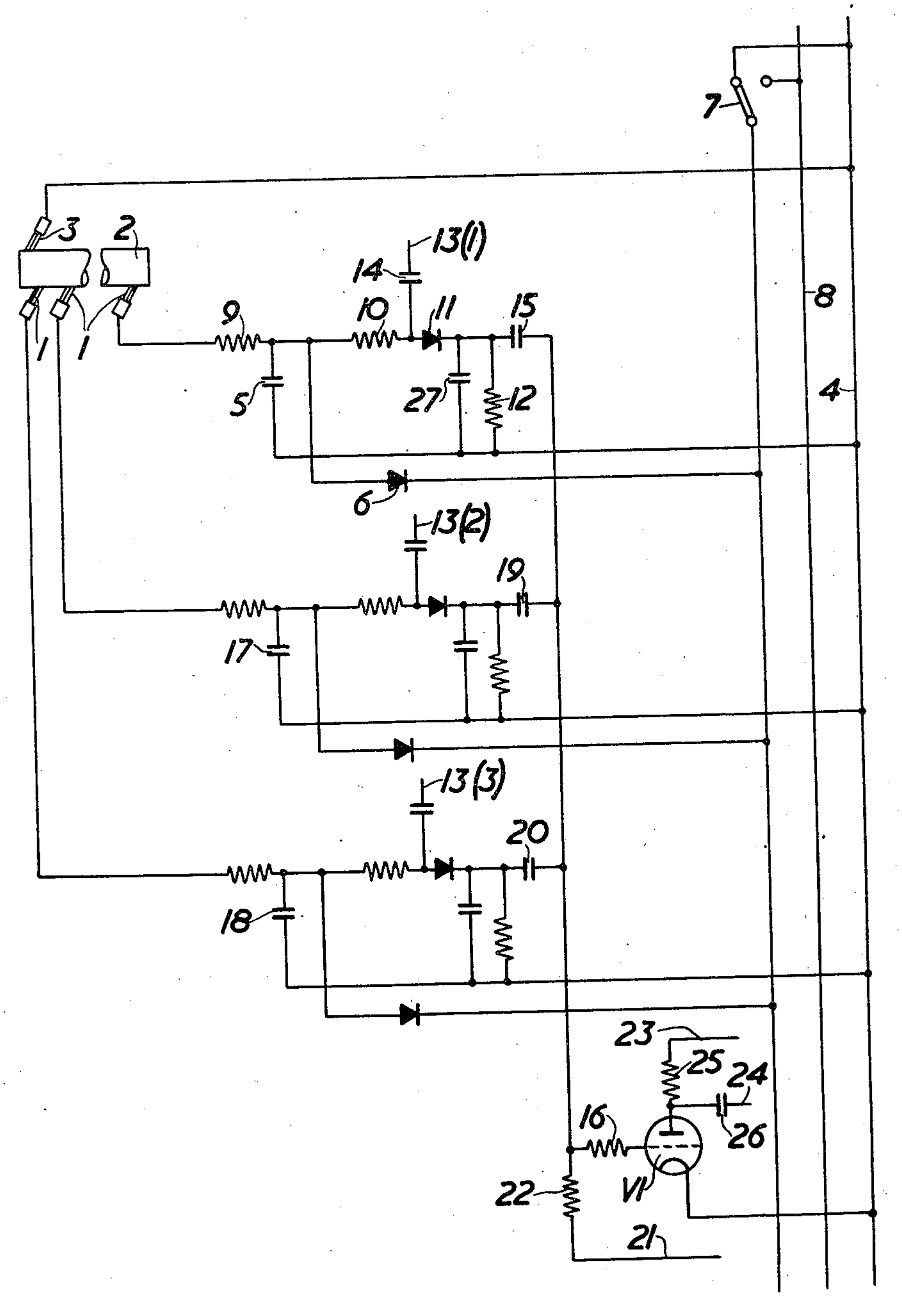
INVENTORS
LORIN KNIGHT
ALEC TRUSSELL
BY [signature]
ATTORNEY

United States Patent Office 2,828,418

Patented Mar. 25, 1958

2,828,418

DATA STORAGE DEVICES

Lorin Knight and Alec Trussell, Letchworth, England, assignors to The British Tabulating Machine Company Limited, London, England Application March 2, 1955, Serial No. 491,622

Claims priority, application Great Britain May 20, 1954

6 Claims. (Cl. 250—27)

This invention relates to electronic data storage devices.

In British patent specification No. 707,359 there is described a data storage device which is particularly suitable for storing data sensed from a punched card and allowing subsequent read out of the data to an electronic calculating or computing machine. This employs a capacitor in the cathode circuit of a valve, the charge on the capacitor representing a data item.

The object of the present invention is to provide a simplified form of data storage device, utilising a capacitor which may be charged to one or the other of two voltages.

According to the invention, a data storage device has a capacitor, means for charging the capacitor to either a first or second voltage, indicative of the presence or absence of a data item, respectively, a first diode, means for biasing the diode by means of the voltage across the capacitor, the diode being substantially non-conducting for both of said voltages, means for applying a pulse to the diode, the pulse being of such amplitude that the diode is rendered conductive only if the capacitor is charged to said first voltage and a load circuit across which a voltage is developed when the diode conducts. A number of storage devices may be pulsed in succession and the outputs from the devices may be fed to a single output circuit.

The invention will now be described by way of example, with reference to the accompanying drawing, which is a diagram of a circuit employing three storage devices.

The storage devices are to be used to store data from punched record cards, which are sensed by a conventional sensing roll 2 and brushes 1. The roll 2 is connected to a ground line 4 by a common brush 3.

The data from one column of a card is stored by a capacitor 5. This capacitor may be charged, through a semiconductor diode 6, by setting a switch 7 to connect the diode to a —93 volt supply line 8. The switch 7 may conveniently be operated by a cam which is driven in synchronism with the sensing roll 2. The switch 7 is operated to charge the capacitor 5 before each index point position of the card is sensed.

The capacitor 5 is connected to one of the brushes 1, through a resistor 9. The capacitor is also connected to the ground line 4, through a resistor 10, a diode 11 and a resistor 12. When the capacitor is charged, and the switch 7 is in the position shown, the voltage is applied in the reverse direction across the diodes 6 and 11.

The reverse resistance of the diodes is sufficiently high to maintain the voltage across the capacitor substantially constant during the sensing of a card, when the value of the capacitor is of the order of .25 microfarad. Thus, the capacitor will only be appreciably discharged if the brush 1 is allowed to make contact with the roll 2, by a hole in the card. This allows the capacitor to discharge rapidly through the resistor 9.

After each index point has been sensed, a positive pulse of approximately 50 volts amplitude is applied to the anode of the diode 11, via a line 13(1) and a capacitor

14. If the capacitor 5 is charged, the pulse will not overcome the biasing voltage on the diode, which will remain non-conducting. If the brush 1 has discharged the capacitor, the diode 11 will conduct when the pulse is applied, and a positive pulse will be fed to the grid of a valve V1, via a capacitor 15 and a grid current limiting resistor 16. Thus the valve V1 will only receive a pulse when a hole has been sensed at the corresponding index point. A capacitor 27 serves to attenuate any unwanted pulses, which may occur due to the self-capacitance of the diode 11.

Capacitors 17 and 18 are connected to form storage circuits similar to that of the capacitor 5. The discharging of these capacitors is controlled by the other brushes 1, which sense two further columns of the card. Read out pulses are applied to these storage circuits, via lines 13(2) and 13(3). The outputs of the circuit are also fed to the valve V1, by capacitors 19 and 20.

The grid of the valve V1 is connected to a —20 volt bias line 21, through a resistor 22, so that the valve is normally non-conducting. The anode of the valve is connected to a +160 volt supply line 23 through an anode load resistor 25. An output line 24 is fed from the anode, via a capacitor 26. Thus, a positive pulse fed to the grid of V1 will produce a negative pulse on the output line 24.

Positive pulses are fed sequentially to the lines 13(1), 13(2), and 13(3). If all three of the brushes 1 sense holes at a particular index point, then the valve V1 will produce a sequence of three pulses on the output line 24, so converting the parallel sensing of the card to serial representation on the output line.

The use of the storage device in conjunction with an electronic calculator is described in British patent application No. 14,993/53. In one form, the pulses on the output line 24 are fed to four gates, which are controlled by cam contacts operated in synchronism with the card sensing mechanism. The output lines from the gates represent the values 1, 2, 4 and 8, and the contacts control the gates so that, at the "7" index point for example, a single pulse on the line 24 produces an output from the gates representing the values 1, 2 and 4. The output pulses from the gates are fed to a shifting register, which receives shifting pulses synchronised with the pulses on the lines 13.

In another form, a group of four storage devices are used to represent the values 1, 2, 4 and 8, so that each group may store one decimal, or duo-decimal, digit. The storage capacitors are then discharged under control of relay contacts, and are re-charged once each card sensing cycle.

It may be pointed out that if the pulses on the lines 13 are of short duration, several pulses may be applied without greatly altering the voltage across the storage capacitor. This allows the same data to be read out a number of times, for each input to the storage device. It will be appreciated that negative read out pulses may be used, if the relative polarities of the diodes and the bias voltages are reversed. The valve V1 is then operated in a normally conducting condition.

A suitable card sensing mechanism is also shown in British patent application No. 14,993/53.

What we claim is:

1. A data storage device comprising means for sensing a column of a record card, a capacitor, means for setting the voltage across said capacitor to a first value prior to the sensing of each index point position of said card, means controlled by said sensing means for setting the voltage across said capacitor to a second value on the sensing of an index point on said card, a diode, means for biasing said diode by the voltage across said capacitor, said diode being substantially non-conducting for either of said values, means for applying subsequent to the sensing of each index point position a pulse to said diode of such amplitude that said diode is rendered conductive only when the voltage across said capacitor has said second value, and a load circuit operatively connected in series with said diode and said applying means, whereby the pulse is transmitted to said load circuit when said diode is conductive.

2. A data storage device comprising means for sensing a column of a record card, a capacitor, a first diode, means for charging said capacitor through said first diode to a first voltage prior to the sensing of each index point position of said card, means controlled by said sensing means for discharging said capacitor to a second voltage on the sensing of an index point on said card, a second diode, means for biasing said second diode by the voltage across said capacitor, said second diode being substantially non-conducting for either of said voltages, means for applying subsequent to the sensing of each index point position a pulse to said second diode of such amplitude that said second diode is rendered conductive only when said capacitor has said second voltage, and a load circuit operatively connected in series with said second diode and said applying means, whereby the pulse is transmitted to said load circuit when said second diode is conductive.

3. A data translating apparatus comprising a plurality of data storage devices, each of said devices including means for sensing a column of a record card, a capacitor, a first diode, means for charging said capacitor through said first diode to a first voltage prior to the sensing of each index point position of said card, means controlled by said sensing means for discharging said capacitor to a second voltage on the sensing of an index point on said card, a second diode, and means for biasing said second diode by the voltage across said capacitor, said second diode being substantially non-conducting for either of said voltages; means for applying pulses to the second diodes of said storage devices, in sequence, subsequent to the sensing of each index point position, said pulses being of such amplitude that a second diode is rendered conductive only when the biasing capacitor has said second voltage; and a load circuit operatively connected in series with said second diode of each storage device and said pulse applying means, whereby a pulse is transmitted to said load circuit from a storage device when said second diode of that device is conductive.

4. Data translating apparatus as claimed in claim 3 comprising also a thermionic valve which is normally non-conducting and which is driven into conduction by a pulse transmitted to said load circuit.

5. Data translating apparatus as claimed in claim 4 in which said pulse applying means includes a coupling capacitor for each said storage device.

6. Data translating apparatus as claimed in claim 3 in which all the storage devices have a common load circuit.

References Cited in the file of this patent

UNITED STATES PATENTS

| | | |
|---|---|---|
| 2,496,979 | Blumlein | Feb. 7, 1950 |
| 2,612,550 | Jacobi | Sept. 30, 1952 |
| 2,673,936 | Harris | Mar. 30, 1954 |
| 2,760,160 | Flood et al. | Aug. 13, 1956 |